Dec. 10, 1963  S. G. WOODWARD ETAL  3,113,523

VALVE STRUCTURE

Filed July 23, 1962

WITNESS:
Esther M. Stockton

INVENTORS
Stephen G. Woodward
Kenneth Donald Aumick
BY
John Phillips Ryan
ATTORNEY

United States Patent Office 3,113,523
Patented Dec. 10, 1963

3,113,523
VALVE STRUCTURE
Stephen G. Woodward, Horseheads, and Kenneth Donald Aumick, Pine City, N.Y., assignors to The Bendix Corporation, Elmira Heights, N.Y., a corporation of Delaware
Filed July 23, 1962, Ser. No. 211,532
4 Claims. (Cl. 103—53)

The present invention relates to a valve structure and more particularly to a double check valve assembly for a plunger type electromagnetic pump.

Check valve structures in the prior art have generally been provided by means of ball, piston or conical plunger members coacting with an appropriately formed valve seat member. While these types of valve structures have usually served the desired function, they have, due to inherent structural limitations, introduced undesirable slowness into the pump operation and materially limited initial pump capabilities. In reciprocating plunger type electromagnetic pumps it is desirable that these inherent limitations be eliminated and that the amount of plunger movement be held to a minimum in order to reduce the over-all size of the pump. With a reduced amount of plunger travel it is desirable during the suction stroke of the pump plunger that a maximum amount of fluid be rapidly drawn into the cavity defined between the double check valves. During the compression stroke of the plunger it is equally desirable that a maximum amount of fluid be rapidly forced into the hollow plunger. In the prior art valve structures the maximum amount of valve flow area is attained only after attaining a maximum opening between the valve seat and the periphery of the solid movable ball, piston or conical plunger member of the valve assembly and, of course, maximum flow through the valve is not attained until the movable valve member has been displaced a maximum amount relative to the valve seat. This limitation materially affects the pump capabilities.

We have found that the initial pump capacity and the speed of pump operation can be improved through the use of our new and novel valve assembly comprising discoid valve and seat members each containing a plurality of apertures and lands. The lands and apertures of the valve members are radially mismatched relative to the lands and apertures of the seat members and upon valve closure the lands of the valve and seat members overlie the opposite apertures thereby completely closing off all fluid flow. However, when the valve members move away from the seat members the slightest degree of movement will provide considerable flow area by exposing the many peripheral areas formed by each of the apertures. The increased peripheral areas or flow area thus allows the suction or pressure created by the pump plunger movement to be immediately effective in providing a maximum fluid flow. The pump is therefore capable of providing greater initial capacity, of operating faster, and has more desirable structural dimensions.

It is an object of the present invention to provide a valve structure which provides large flow areas with the slightest movement of the valve members away from the seat members.

It is another object of the present invention to provide a valve structure which provides an effective and positive cutoff of fluids.

It is still another object of the present invention to provide a valve structure which is facile, efficient in operation and economical to manufacture and fabricate.

It is a further object of the present invention to provide a valve structure for an electromagnetic plunger type pump wherein discoid valve and seat members each comprise mismatched lands and apertures which provide a fluid tight seal when the members are engaged and which provide large peripheral areas and, consequently, large flow areas when the members are slightly separated.

Further objects and advantages will be apparent from the following description taken in connection with the accompanying drawing in which.

Figure 1:
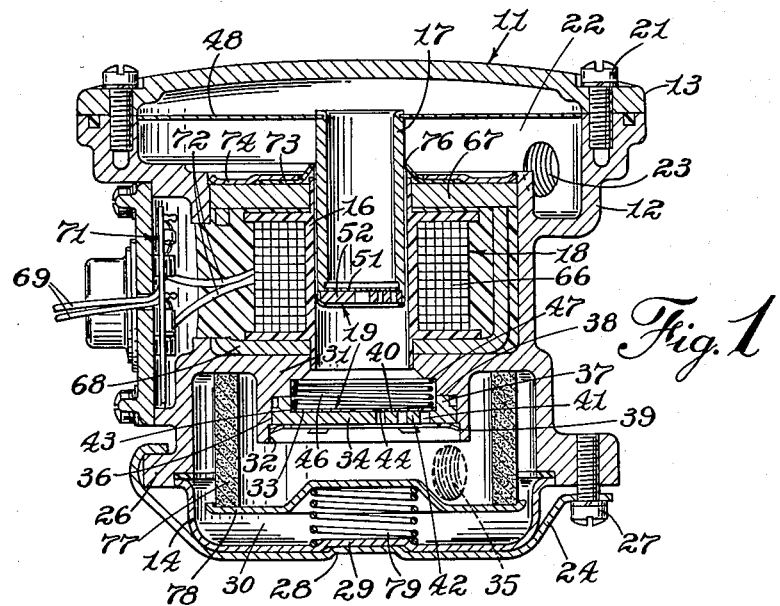
FIGURE 1 is a side elevational view, in section, of an electromagnetic plunger type pump embodying the present invention.

Referring now more particularly to the accompanying drawing in which like reference numerals and characters indicate like parts, numeral 11 generally designates an electromagnetic plunger type pump supported in a housing 12 closed by upper and lower cover members 13 and 14, respectively. The pump mechanism includes a hollow cylinder 16 of non-magnetic material, a hollow sliding plunger 17 of magnetic material, plunger actuator means generally designated 18 and a double check valve assembly generally designated as 19. The check valve assembly is partially supported in both the housing and plunger.

The housing is preferably a die cast hollow cylindrical member providing the main support for the pump mechanism. The upper cover 13 is secured to the housing by bolts 21 to define a high pressure fluid outlet chamber 22 having a threaded outlet 23 adapted for connection to an appropriate fitting (not shown). The lower cover 14 is secured to the housing by a bail 24 which at one of its extremities engages the flange 26 of the housing and at its other extremity is fastened to the housing by a bolt 27. Intermediate the bail extremities the bail is appropriately deformed as at 28 to complement and engage an indentation 29 in the cover 14. The cover 14 and the housing in combination define a low pressure fluid inlet chamber 30.

Figure 2:
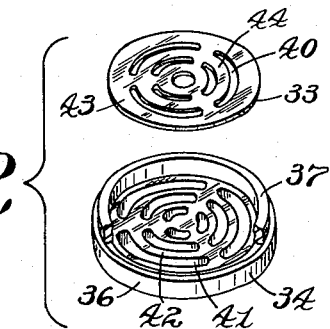
FIGURE 2 is an exploded, enlarged, detailed perspective view, partly broken away, of a discoid valve and seat assembly embodying the present invention; and, FIGURE 3 is an enlarged, fragmentary, detailed view of the plunger and associated valve assembly illustrated in FIGURE 1.

An integral radial flange 31 formed on the inner wall of the housing extends into the housing cavity to define a centrally located axial aperture 32. The suction valve assembly, which forms one part of the double check valve 19, is supported in the flange aperture. The suction valve seat 34, best illustrated in FIGURE 2, is formed as a discoid 36 having an annular ridge 37 adapted to be biased into engagement with the rim 38 formed in the flange aperture by a retainer spring 39. The discoid 36 has a plurality of axial concentric segmental apertures or slots 41 formed therein which, in turn, define a plurality of concentric lands 42. The discoid suction valve 33 is formed as a relatively thin discoid 43 adapted to fit within the annular opening defined by the ridge 37 and the housing flange aperture. The suction valve 33 has a plurality of axial concentric segmental apertures 40 formed therein which, in turn, define a plurality of concentric lands 44. The apertures 40 of the suction valve 33 are formed so as to overlie the lands 42 of the suction valve seat 34 when the suction valve is biased to a valve closed condition by spring 46 which is compressively confined between the suction valve 33 and the rim 47 of the flange aperture.

The hollow cylinder 16 is fitted into the flange 31 to provide a passage communicating between the outlet and inlet chambers 22 and 30, respectively. The hollow plunger 17 is slidably disposed within the cylinder 16 and is biased to its rest position (illustrated in FIGURE 1) by a spider shaped spring 48. The spider type spring 48 makes possible a smaller pump package by reducing the over-all pump dimensions. The spring also plays an important part in the frequency at which the pump is designed to operate. By using a particular mass of the plunger 17 and a predetermined spring rate, a substantially resonant oscillating frequency condition is attainable and the spring-plunger frequency will coincide with the drive frequency provided by the plunger actuator means 18. The resonant oscillating frequency condition causes the plunger 17 to travel a maximum distance for the particular frequency of operation selected.

Figure 3:
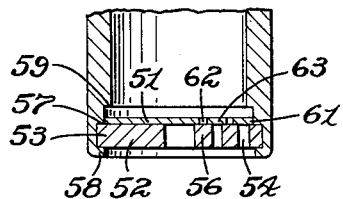

Disposed in the lower extremity of the plunger is the pressure valve assembly which is the remaining part comprising the generally designated double check valve 19. The pressure valve assembly is best illustrated in FIGURE 3. The pressure valve seat 52 is similar in structure to the suction valve seat 34 being a discoid 53 having a plurality of axial concentric segmental apertures or slots 54 which, in turn, define a plurality of concentric lands 56. The discoid 53 is secured in the plunger between the flange 57 and the inturned lip 58 of the plunger. The discoid pressure valve 51 is loosely supported between the flange 59 of the plunger and the upper face of the discoid 53. The pressure valve 51 is similar in structure to the suction valve 33 being a relatively thin discoid 61 having a plurality of axial concentric segmental apertures or slots 62 which, in turn, define a plurality of concentric lands 63. As in the suction valve assembly, the apertures 62 of the pressure valve are formed so as to overlie the lands 56 of the pressure valve seat 52 when the pressure valve 51 engages the seat and assumes a valve closed condition.

A solenoid 66 encased in an epoxy resin and appropriately formed upper and lower pole pieces 67 and 68, respectively, are disposed about the hollow cylinder 16 above the flange aperture to provide the plunger actuator mechanism generally designated as 18. An external source of energy is connected by leads 69 to a transistor-oscillator driving circuit generally designated 71 with the oscillator output pulses being fed to the solenoid by leads 72.

The means of sealing the fuel in the high pressure outlet chamber 22 and preventing a flow to the low pressure inlet chamber 30 is obtained with a flexible Teflon seal 73 retained in position by a flat washer like retainer 74 secured to the upper pole piece 67. The seal has an aperture 76 centrally formed therein which is adapted to slidably engage against the plunger 17 with the edge portion of the aperture upturned and extending into the outlet chamber whereby the outlet fluid pressure will assert a force on the seal and cause it to lightly engage the plunger surface thereby allowing the plunger fit in the hollow cylinder 16 to be comparatively loose and insensitive to any entrained dirt in the fuel.

In operation—energy is supplied to the transistor-oscillator circuit 71 from an external source via the leads 69. The transistor-oscillator circuit provides intermittent driving pulses which are fed to the solenoid 66 by leads 72. The driving pulses thus supplied are high current pulses of a fixed width having a frequency determined by a multi-vibrator-amplifier combination which is part of the electromagnet control circuitry generally designated as 71. The intermittent pulses energize the solenoid and create a magnetic field which attracts the plunger 17 away from its rest position to a lower actuated position. The plunger lower actuated position is reached when the plunger is substantially centered within the solenoid. Movement of the plunger towards a lower actuated position causes any fluids entrapped between the double check valve assembly 19 to actuate the pressure valve 51 away from the pressure valve seat 52 and allow the fluids to flow into the hollow cavity of the plunger. Concomitantly the fluids and spring 46 will force the suction valve 33 against the suction valve seat 34 to prevent a fluid flow back into the inlet chamber. When the solenoid is de-energized the spider type spring 48 will bias the plunger beyond the rest position illustrated in FIGURE 1 to an upper actuated position determined by the resonant frequency of operation. The movement of the plunger toward the upper actuated position will cause the pressure valve assembly to close and the suction valve assembly to open. The fluid within the plunger causes the pressure valve to engage the upper surface of the pressure valve seat whereby the pressure valve lands 63 overlie the pressure valve seat apertures 54 bringing about a valve closed condition. The movement of the plunger within the cylinder 16 toward its upper actuated position creates a suction therein which causes the suction valve 33 to be drawn away from the suction valve seat 34, thus exposing the peripheral surfaces of the suction valve seat apertures 41 and allowing fuel to be rapidly drawn into the inlet cavity 30 from a reservoir (not shown) through the inlet 35 and through the filter element 77. The filter element is retained within the inlet chamber by the filter retainer 78 and the biasing retainer spring 79. Upon subsequent energization of the solenoid, the cycle will be repeated and fluids entrapped between the double check valve assembly will be forced to ultimately flow from the low pressure inlet chamber to the high pressure outlet chamber.

It can be readily appreciated by those skilled in the art that much additional flow area is available through the mismatched construction due to the additional periphery provided around each of the several apertures or slots when the valve assemblies of the type described are opened slightly, and thus the utilizing pump has a greater initial capacity and provides a faster and more efficient pump operation.

The foregoing description is considered illustrative only of the principles of the invention. Further, since numerous modifications and changes will readily occur to those skilled in the art, it is not desired to limit the invention to the exact construction shown and described and, accordingly, all suitable modifications and changes can be resorted to falling within the scope of the invention as claimed.

We claim:
1. A fluid pump comprising, in combination:
a pump housing;
cover means cooperating with the housing to define a separate inlet chamber and an outlet chamber;
a hollow cylinder of non-magnetizable material supported in the housing communicating between the chambers;
a plunger of magnetizable material slidably mounted in the cylinder for reciprocal movement between upper and lower actuated positions;
means, including an energizable solenoid supported in the housing coaxial with the cylinder, adapted upon energization to create an electromagnetic field capable of attracting the plunger to its lower actuated position;
means providing a controllable source of energy for energizing the means for attracting the plunger to its lower actuated position;
means providing a seal between the outlet chamber and the plunger adapted to be responsive to outlet fluid pressures;
a spider shaped spring member in the outlet chamber supported at its outermost extremities between the housing and the cooperating cover means and fixedly secured at its innermost portion to one extremity of the plunger adapted to bias the plunger to its upper actuated position upon the de-energization of the solenoid; and,
double check valve means including a pressure check valve assembly in the other extremity of the plunger and a suction valve assembly supported in the housing inlet chamber adjacent the plunger lower actuated position, said valve assemblies each comprising:
a fixed discoid seat member having a plurality of concentric lands and concentric segmental apertures formed therein; and, a movable discoid valve member in coaxial alignment with the fixed seat member adapted for movement into and out of engagement with the fixed seat member having a plurality of concentric lands and concentric segmental apertures formed therein, said movable valve member lands and apertures being radially mismatched relative to the lands and apertures of the fixed seat member when the valve member engages the fixed seat member so that the lands will overlie the apertures providing a valve closed condition.

2. The fluid pump set forth in claim 1 wherein the means providing the seal between the outlet chamber and plunger comprise:

a pliant plastic member fixedly secured to the housing, said member having an aperture therein adapted to slidably engage the plunger with the edge portion of the aperture upturned and extending into the outlet chamber whereby the fluid pressure in the outlet chamber will assert a force on the seal adjacent its aperture and cause the plastic member to tightly engage the plunger surface.

3. The fluid pump set forth in claim 2 wherein the plastic seal member is formed of Teflon.

4. The fluid pump set forth in claim 1 wherein:

the spider shaped spring has a predetermined spring rate adapted when matched to the plunger member to provide a resonant oscillating frequency condition; and, the means providing a controllable source of energy is further adapted to provide a drive current pulse having a fixed width and a predetermined frequency, said spring-plunger resonant oscillating frequency and the drive frequency being substantially identical whereby the plunger is caused to travel a maximum distance between its lower and upper actuated positions.

References Cited in the file of this patent
UNITED STATES PATENTS 2,765,747 Aumick _____ Oct. 9, 1956

FOREIGN PATENTS 33,311 Austria _____ June 10, 1908
6,299 Great Britain _____ of 1910
8,935 Great Britain _____ of 1915